United States Patent Office 2,906,717
Patented Sept. 29, 1959

2,906,717

ALDEHYDE RESIN-EPOXY RESIN-ORGANIC POLYISOCYANATE PREPOLYMER, METHOD OF MAKING FOAM THEREFROM AND PRODUCT

Kazys Sekmakas, Chicago, Ill., assignor, by mesne assignments, to Minnesota Mining and Manufacturing Company, St. Paul, Minn., a corporation of Delaware No Drawing. Application May 17, 1955
Serial No. 509,101

20 Claims. (Cl. 260—2.5)

This invention relates to a new cellular plastic foam material and to a method of making it. In one of its aspects, this invention relates to a cellular plastic produced by reacting an organic polyisocyanate with a combination of an epoxy and an aldehyde resin and including an isocyanate foaming agent and amine catalyst.

Organic polyisocyanates have heretofore been reacted with polyhydric alcohols as well as polyester or alkyd resins to produce cellular plastics. These cellular plastics have found numerous industrial applications and are currently being used as structural fillers for airplane parts, such as ailerons and other trailing edges, radomes, etc. They are also used for dampening noise and for thermal insulation, especially in those places which are difficultly accessible or where the labor costs of applying the cheaper asbestos type insulating materials is prohibitive. These cellular plastic foams are also employed in the ship-building industry to improve the buoyancy of ships, especially warships. All of these materials have in common a comparatively low density and the rigidity needed in their specific applications. However, there are certain disadvantages associated with the forming of such plastic foams which it would be desirable to overcome. Also, the physical properties of these foams can be improved. For instance, the heat resistance of a cellular plastic is important when it is being used as a structural filler for the trailing edges of airplanes. As the operating speeds of aircraft are increased, the heat resistance of the cellular plastic must be improved in order to resist the higher skin temperatures developed upon the surface of the aircraft.

Some of the properties of the presently available isocyanate foam materials which are undesirable for the purposes to which the foams are to be put include shrinkage, friability and poor resistance to vibration. The first mentioned property is significant when the foam material is to be used to fill a cavity and must adhere to the walls thereof. The tendency of the foam to shrink and pull away from the walls is undesirable. Friability and low resistance to vibration are somewhat related, and are extremely undesirable when the foam is to be subjected to vibration, as for example in moving parts and the trailing edges of airplanes or hulls of ships. We have provided in accordance with the present invention a cellular plastic foam which is considerably improved with respect to the above shortcomings.

One practice in the use of organic polyisocyanate foams is the preparation of a prepolymer of the organic polyisocyanate and the other reactive components which can be subsequently mixed at the proper time with a foaming agent and catalyst. Advantages of this method of forming a prepolymer are (1) a large amount of the exothermic heat of reaction between the organic polyisocyanate and the reactive component is dissipated prior to the actual foaming step; (2) the pre-reaction of the isocyanate with the reactive component removes the hazard to the ultimate producer of the foam due to the toxicity of the isocyanate; (3) generally a more uniform cell structure is obtained in the resulting foam; (4) slower foaming time, thus giving better control of the foaming; (5) a longer mixing time; and (6) the lack of necessity for special equipment. One basic problem connected with the preparation of the prepolymer is its stability. When using alkyd resins as a component reactive with the isocyanate, it is not possible to prepare a stable prepolymer which may be stored for a prolonged period before used. Also, with certain prepolymers the viscosity of the prepolymer must be controlled to a close degree in order that it will produce a uniform cell structure when ultimately foamed. In one of its aspects, the present invention provides for the formation of a prepolymer of reasonable stability and in which viscosity is not a critical factor.

It is an object of this invention to provide improved polyisocyanate plastic foams and a method for producing them.

It is another object of this invention to provide a low density polyisocyanate cellular plastic foam which has greater heat resistance, is less friable and is less subject to shrinkage during cure.

It is a further object of this invention to provide a cellular plastic which can be formed by pre-reacting the isocyanate component with a combination of an epoxy resin and an aldehyde resin to form a resinous prepolymer of reasonable stability, and in which viscosity is not a critical factor.

Still another object of this invention is to provide polyisocyanate cellular plastics which can be produced under less critical conditions and in more versatile combinations.

Further objects and advantages of the present invention will become apparent as the specification proceeds.

The improved cellular plastics of the present invention are produced by the reaction between an organic polyisocyanate and a combination or mixture of an epoxy resin and an aldehyde resin and the inclusion of an isocyanate foaming agent such as water, organic acids and anhydrides, and simple alcohols and ketones, and an amine catalyst. The foaming agent and amine catalyst can be included either during the initial mixing of the reactants or after the formation of a prepolymer as will be hereinafter described. Water and amine catalysts are the preferred foaming agents. If one of the isocyanate foaming agents is not present, insufficient carbon dioxide is produced to form a low density product. If the amine catalyst is absent, the reaction tends to proceed slowly and insufficient heat is generated to cure the foam.

The organic polyisocyanate reactant employed in accordance with the present invention should contain at least two isocyanate groups, and is preferably free of other functional groups which might interfere with the desired reaction. Examples of polyisocyanates which can be employed in accordance with the present invention include polymethylene diisocyanates such as ethylene diisocyanate, trimethylene diisocyanate, dodecamethylene diisocyanate, hexamethylene diisocyanate, tetramethylene diisocyanate, pentamethylene diisocyanate; alkylene diisocyanates such as propylene-1,2-diisocyanate, 2,3-dimethyltetramethylene diisocyanate, butylene-1,2-diisocyanate, butylene-1,3-diisocyanate; alkylidene diisocyanates such as ethylidene diisocyanate and heptylidene diisocyanate; cycloalkylene diisocyanates such as 1,4-diisocyanatocyclohexane, cyclopentylene-1,3-diisocyanate; aromatic polyisocyanates such as m-phenylene diisocyanate, p-phenylene diisocyanate, 1-methyl-phenylene-2,4-diisocyanate, naphthylene-1,4-diisocyanate, o,o'-toluene diisocyanate, diphenyl - 4,4' - diisocyanate, benzene - 1,2,4 - triisocyanate, xylylene-1,4 diisocyanate, xylylene-1,3-diisocyanate, 4,4'-diphenylene-methane diisocyanate, 4,4'-diphenylenepropane diisocyanate; and aliphatic-aromatic diisocyanates such as phenylethylene diisocyanate, etc. Preferred diisocyanates of the present invention include the following hydrocarbon diisocyanates, tolylene diisocyanate, m-phenylene diisocyanate and methylene bis(-4-phenyl) diisocyanate.

One of the compounds reacted with the organic polyisocyanate in accordance with the present invention is an epoxy resin. Epoxy resins are based on the derivatives of ethylene oxide. These epoxy resins are characterized by having ethylene oxide groups at both ends of the polymer chain. More specifically, epoxy resins are formed by the reaction of epihalohydrins with polyhydric organic compounds. One specific example of an epoxy resin is the product of reaction between epichlorohydrin and bis-(4-hydroxyphenyl) dimethylmethane, commonly known as "Bis-phenol A." Methods for the preparation of epoxy resins are described in U.S. Patents No. 2,444,-333 and No. 2,324,483. In effecting the condensation reaction, the ratio of the epihalohydrin to the bis-phenol is maintained slightly below or around 2 to 1. While the bis-phenols are the preferred polyhydric compounds, other polyhydric compounds, particularly polyhydric alcohols such as ethylene glycol or glycerin can be used to produce the epoxy resins useful in accordance with this invention.

There are a number of epoxy resins which are available commercially. For example, the resinous condensation product of epichlorohydrin and "Bis-phenol A" are known as Epon resins and range from solids to viscous liquids having molecular weights of the order of from approximately 1,000 to 3,000, and are sold by the Shell Chemical Company. Also, the Ciba Company markets epoxy resins under the trade name Araldite, and Houghton Laboratories markets an epoxy resin under the trade name Hysol. All of these resins can be used in accordance with the present invention provided they have an epoxide equivalent in the range of about 150 to about 4000. To date, the principal uses of epoxy resin has been in surface coatings, enamels and adhesives.

The aldehyde resins which are combined with the epoxy resins hereinbefore described which are reacted with the organic polyisocyanate to provide the improved cellular plastics of the present invention come in two different types. For example, there are the amino resins and the phenolic resins. The amino resins are resinous condensation products of amino type compounds with aldehydes. Perhaps the most widely known amino resins are the urea-formaldehyde and melamine-formaldehyde resins. Generally, the amino type of compounds which can be reacted with an aldehyde to produce amino resin useful in the present invention include urea, thiourea, melamine, substituted melamine, guanamine, substituted thioamelins, triaminopyrimidine, guanazole, carbamyl guanazole, etc. The preferred amino compounds are urea and melamine. The preferred aldehyde is formaldehyde; however, other aldehydes such as acetaldehyde, propionaldehyde, butyraldehyde, benzaldehyde, furfural, etc. can be employed. Often, in the production of the amino resins, the amino compounds are condensed with aldehydes and also etherified with one or more alcohols and polymerized to any desired degree. Therefore, the following competing reactions are taking place simultaneously: condensation, etherification, and polymerization. Control of these reactions is obtained by adjusting the type and ratio of components, and the reaction conditions of catalyst, time, and temperature.

The reason for etherification of the amino-aldehyde condensation product with an alcohol is to adjust the solubility of the material in organic solvents. The lower alcohols with very short carbon chains, or small non-polar groups, are less effective than the higher alcohols with longer carbon chains for producing organic solvent-soluble resins. One of the most generally used alcohols for etherification purposes is butyl alcohol. Aromatic type alcohols such as xylenol are also employed, either alone or in admixture with butanol. Amino resins are also compatible with alkyd resins and some varnishes and oils. The principal uses for amino resins has been in surface coatings, enamels and adhesives. However, they have been used in a wide variety of products which include plastics, molding compounds, etc., and for imparting wet-strength to paper and for producing water-repellent, crease-resistant and shrink-resistant textiles.

The other type of aldehyde resins which can be used in combination with the epoxy resins to be reacted with diisocyanates in accordance with the present invention are the phenolic resins. Phenolic resins are resinous condensation products of phenol type compounds with aldehydes. Perhaps the most widely known phenolic resin is the one produced by the condensation of phenol and formaldehyde. Generally, the phenol type of compound which can be reacted with formaldehyde to produce phenolic resins include phenol, the various cresols and xylenols, and resorcinol. By far the most common aldehyde used in the production of phenolic resins is formaldehyde. However, other aldehydes such as acetaldehyde, propionaldehyde, butyraldehyde, benzaldehyde, furfural, and hexamethylene tetramine can be employed. The reaction between the phenol and aldehyde can be carried out in either an acid or alkaline medium, and the condensation product produced will have different properties. Generally, the phenol and aldehyde are reacted in a mol ratio of from 1 to 3 mols of aldehyde per mol of phenol.

The principal uses for phenolic resins has been in molding compounds, surface coatings, enamels and adhesives. A number of phenolic resins are available commercially which can be used in accordance with the present invention.

As a catalyst for the production of the foams, any amine or mixture of amine can be used. Primary, secondary and tertiary amines are included among those which can be employed as catalysts. The following are illustrative: ethylene diamine, triethylamine, diethylene triamine, piperidine, N-methyl morpholine, and 3-diethylaminopropylamine.

Generally, in accordance with the present invention, commercially available epoxy resins, such as the condensation product of epichlorohydrin and "Bis-phenol A," and aldehyde resins such as urea-formaldehyde, melamine-formaldehyde, and phenol-formaldehyde resins, can be employed without further modifications in the reaction with organic polyisocyanates to provide cellular plastic foams of improved physical properties, as hereinbefore described, in more versatile combinations, and under less critical conditions than heretofore required. The heat of the reaction is sufficient so that the foam produced is self curing. Further, the reaction produces carbon dioxide thereby providing its own blowing agent in situ.

In practising the method of this invention, it is preferred practice to pre-react the organic polyisocyanate component with the combination of epoxy resin and aldehyde resin, with or without a plasticizer, to form a resinous prepolymer which is foamed by the addition of a suitable foaming agent and catalyst. In preparing the resinous prepolymer, the organic polyisocyanate is employed in a quantity sufficient so that after reaction with the epoxy resin and the aldehyde resin there is available in the resinous casting syrup free isocyanate groups which are capable of reacting with the catalyst and diisocyanate foaming agent.

It will be appreciated that while the foregoing is the preferred method for producing the normal cellular plastics of the present invention, they can be produced by mixing together all of the reactants with an isocyanate foaming agent and catalyst immediately prior to use.

In preparing the improved plastic foams in accordance with the present invention, the ingredients are employed in the following preferred ranges for each 100 parts of finished product: 20 to 60 parts by weight of organic polyisocyanate, and the remainder, or 40 to 80 parts of epoxy resin and aldehyde resin in a weight ratio of from 1 to 4 parts of epoxy resin per part of aldehyde resin. The preferred range of ingredients is as follows: 40 parts of isocyanate, and the remainder epoxy resin and aldehyde resin in a ratio of 3 to 1 parts of epoxy resin per part of aldehyde resin.

Any usual plasticizer can be incorporated in the reaction mixture for the purpose of plasticizing the resulting cellular plastic. These plasticizers also serve as mutual solvents for the preparation of compatible mixtures of reactants or catalysts. For example, plasticizers like cresyl diphenyl phosphate, tricresyl phosphate, phthalate esters, chlorinated biphenyls, triglyceride oils, polyhydric alcohols and their fatty acid esters, unmodified alkyd resins, oil modified alkyd resins, and epoxy esters. Epoxy esters have been found to be particularly efficient for incorporation in the cellular plastics of this invention. They not only impart desired degree of plasticity to the foam but they also improve the character of the foam. Epoxy esters are produced by the esterification of epoxy resins with organic acids such as long-chain fatty acids containing from 8 to 22 carbon atoms, i.e., oleic acid, castor oil acids, and tall oil acids and the like. The esterification of epoxy resins with these acids is a relatively simple process. In some cases, the properties of the cellular plastics of this invention can be still further improved by employing a polyhydric alcohol monomer as an additional reactant. Examples include glycerol, ethylene glycol, 1,3-butanediol, polyethylene glycols, octylene glycol, pentaerythritol, hexose, sorbitol, etc.

Certain additives, such as emulsifiers, non-ionic wetting agents and foam stabilizers, can be employed if desired.

By reacting an organic polyisocyanate with a mixture of an epoxy resin and an aldehyde resin, I obtain a structure of highly cross-linked three-dimensional molecules having restricted and finally arrested motion. The result is a more rigid and less heat sensitive cellular plastic. The low density foams prepared according to this invention have exceptionally good heat stability, are characterized by a high degree of cross-linking, have a uniform cell structure, low penetrability by water, and exhibit strong adhesive bonds to metals, fiber glass laminates, wood and other materials.

This invention is further illustrated by the following specific examples:

Example I 10 parts by weight of a melamine-formaldehyde resin marketed by Rohm & Haas under the trade name Uformite QR 336, was dissolved in 10 parts by weight of an epoxy resin product of Bis phenol A and epichlorohydrin having an epoxide equivalent of about 150–210 and a molecular weight of about 350 marketed by Shell Chemical Corporation under the trade name Epon 828 with heat. To this was added with high speed agitation 10 parts by weight of 2,4-tolylene diisocyanate and 0.1 part by weight of Aerosol OT, a dioctyl sodium sulfosuccinate emulsifier marketed by American Cyanamid Co. The foregoing mixture produced by the agitation was foamed by the addition of 0.3 part of water and 0.2 part of N-methyl morpholine. The resulting cellular plastic product had a density of 3.7 pounds per cubic foot and was not adversely affected by a temperature of 300° F.

Example II 8 parts by weight of a urea-formaldehyde resin marketed by Rohm & Haas under the trade name Uformite QR 351 was melted in 16 parts by weight of an epoxy resin marketed by Houghton Laboratories under the trade name Hysol 6020. To this mixture was added 8 parts by weight of 2,4-tolylene diisocyanate and 0.1 part of an emulsifier (Emulphor ELA, a water soluble polyethylene ether of fatty acid marketed by Antara Chemical Co.) and the mixture subjected to high speed agitation until an even, creamy textured mixture resulted. This mixture was foamed by the addition of 0.25 part by weight of water and 0.15 part of N-methyl morpholine. The resulting cellular product had a density of 4.5 pounds per cubic foot.

Example III 5 parts by weight of a phenol-formaldehyde resin, marketed by the Bakelite Company under the trade name Bakelite BR No. 254, was melted in 15 parts by weight of an epoxy resin as employed in Example II. To this mixture was added with high speed agitation, 8 parts by weight of 2,4-tolylene dissocyanate and 0.1 part of the emulsifier employed in Example II until an even, creamy textured mixture resulted. This mixture was foamed by the addition of 0.25 part by weight of water and 0.15 part of N-methyl morpholine. The resulting cellular product had a density of 5 pounds per cubic foot and was not adversely affected by a temperature of 300° F.

Example IV 5 parts by weight of a urea-formaldehyde resin as employed in Example II was dissolved in 10 parts by weight of an epoxy resin marketed by Ciba Chemical Co. under the trade name Araldite No. 101. To this mixture was added with high speed agitation 10 parts by weight of 2,4-tolylene diisocyanate, 5 parts by weight of polyethylene glycol 400 (polyethylene glycol having a molecular weight of 400), and 0.1 part of an emulsifier. After thorough blending the foregoing mixture was foamed by the addition of 0.25 part of water and 0.15 part of 3-diethylaminopropylamine. The resulting cellular product had a density of 3.9 pounds per cubic foot, a compression strength of 115 pounds per square inch, and was not adversely affected by a temperature of 300° F.

Example V 6.5 parts by weight of an epoxy resin as employed in Examples II and III was blended with 6.5 parts of an epoxy ester prepared by reacting 30 parts by weight of castor oil fatty acids with 70 parts by weight of an epoxy resin reaction product of "Bis phenol A" and epichlorohydrin having an epoxide equivalent in the range of 905 to 985 marketed by Shell Chemical Co. under the trade name Epon 1004 containing 33% tricresyl phosphate. To this blend was added 13 parts by weight of an organic isocyanate comprising a mixture of 2,4- and 2,6-isomers of tolylene isocyanate, and the mixture warmed to approximately 150 to 160° F. for a period of about one hour. After cooling to room temperature, the mixture was foamed by the addition of 3.3 parts by weight of a melamine resin as employed in Example I, 1.6 parts by weight of polyethylene glycol 200, 0.2 part of N-methyl morpholine, and 0.4 part of water. The resulting cellular product had a density of 6.8 pounds per cubic foot.

Example VI 12 parts of a mixture of 2,4- and 2,6-tolylene diisocyanate isomers was blended with 6 parts of an epoxy ester prepared by reacting at 480° F. 30 parts of oleic acid with 70 parts by weight of the epoxy resin marketed by Shell Chemical Co. under the trade name Epon 1004 employed in Example V. To the epoxy ester 33% of tricresyl phosphate was added. To this blend was added 10 parts by weight of an epoxy resin marketed by Irvington Varnish & Insulator Co. under the trade name Cardolite 7019. Cardolite 7019 is an epoxy resin reaction product of epichlorohydrin and a mixture of poly (hydroxyphenyl) pentadecanes having an epoxide equivalent of 420–440, and a specific gravity of about 1.135. The mixture was foamed by the addition of 3 parts by weight of a urea-formaldehyde resin as employed in Example II, 3 parts of polyethylene glycol 400, 1.8 parts of glycerine, 0.2 part of 3-diethylaminopropylamine, and 0.3 part of water. The resulting product had a density of 12 pounds per cubic foot and a heat resistance of 260° F.

*Example VII*

9.6 parts by weight of tolylene diisocyanate, 6.4 parts by weight of a bis-phenol-epichlorohydrin epoxy resin marketed by Shell Chemical Co. under the trade name Epon 834 and having an epoxide equivalent of from 225 to 290, 2.0 parts by weight of castor oil, and 2.0 parts by weight of butyl benzyl phthalate were mixed together at room temperature and allowed to react exothermally with continuous stirring. After the mixture began to cool, it was heated to about 100–110° C. and kept at this temperature for about 60 to 90 minutes. After cooling to room temperature, the foregoing mixture was foamed by the addition of 2.0 parts by weight of a phenol-formaldehyde resin as employed in Example III, 2.0 parts by weight of polyethylene glycol 400, 1.8 parts of glycerine, 0.25 part of water and 0.15 part of N-methyl morpholine. The resulting product had an even, uniform cell structure, a density of 5.5 pounds per cubic foot, a compression strength of 130 pounds per square inch, and a heat resistance of 260° F.

*Example VIII*

1.5 parts by weight of a urea-formaldehyde resin as employed in Examples II and IV was dissolved in 5.0 parts by weight of the epoxy resin as employed in Example I. To this mixture 12 parts by weight of tolylene diisocyanate and 5.0 parts by weight of castor oil was mixed and the reaction allowed to occur exothermally with continuous stirring. As the material began to cool, the temperature of the mixture was brought to about 100° C. After cooling to room temperature, the foregoing mixture was foamed by the addition of 1.7 parts by weight of polyethylene glycol 400, 1.8 parts by weight of glycerine, 0.3 part of water and 0.15 part of 3-diethylamino propylamine. The resulting product was of even, uniform cell structure, having a density of 4.6 pounds per cubic foot and a compression strength of 120 pounds per square inch.

While this invention has been described and exemplified in terms of its preferred modifications, those skilled in the art will appreciate that modifications can be made without departing from the spirit and scope of the invention.

I claim:

1. A process for the production of a cellular plastic material which comprises pre-reacting 20–60 parts by weight of an organic polyisocyanate with 40–80 parts by weight of a mixture of an epoxy resin and an aldehyde resin in the presence of a plasticizing solvent to form a resinous polymerization product having free isocyanate groups still available, and foaming said polymerization product in the presence of a tertiary amine catalyst and water to produce a cellular plastic foam, said aldehyde and epoxy resins being present in a weight ratio of about 1 to about 4 parts epoxy resin to each part aldehyde resin, said aldehyde resin being selected from the group consisting of an amine-aldehyde resin and a phenolaldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

2. A process according to claim 1 wherein said plasticizing solvent is an epoxy resin ester produced by the reaction between an epoxy resin and a long-chain fatty acid having from 8 to 22 carbon atoms.

3. A process for the production of a cellular plastic material which comprises pre-reacting 20–60 parts by weight of an organic polyisocyanate with 40–80 parts by weight of a mixture of an epoxy resin and a urea-formaldehyde resin in the presence of a plasticizing solvent to form a resinous polymerization product having free isocyanate groups still available, and foaming said polymerization product in the presence of a tertiary amine catalyst and water to produce a cellular plastic foam, said epoxy resin and urea-formaldehyde resin being present in a weight ratio of about 1 to about 4 parts epoxy resin to each part urea-formaldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

4. A process according to claim 3 wherein the organic polyisocyanate is tolylene diisocyanate, the epoxy resin is the product of the reaction between epichlorohydrin and a bis-phenol, and the plasticizing solvent is an epoxy resin ester produced by the esterification of an epoxy resin with a long-chain fatty acid containing from 8 to 22 carbon atoms.

5. A process for the production of a cellular plastic material which comprises pre-reacting 20–60 parts by weight of an organic polyisocyanate with 40–80 parts by weight of a mixture of an epoxy resin and a melamine-formaldehyde resin in the presence of a plasticizing solvent to form a resinous polymerization product having free isocyanate groups still available, and foaming said polymerization product in the presence of a tertiary amine catalyst and water to produce a cellular plastic foam, said epoxy resin and melamine-formaldehyde resin being present in a weight ratio of about 1 to about 4 parts epoxy resin to each part melamine-formaldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

6. A process according to claim 5 wherein the organic polyisocyanate is tolylene diisocyanate, the epoxy resin is the product produced by the reaction between epichlorohydrin and a bis-phenol, and the plasticizing solvent is an epoxy resin ester produced by the esterification of an epoxy resin with a long-chain fatty acid having from 8 to 22 carbon atoms.

7. A prepolymer from which a cellular plastic foam can be produced comprising a resinous polymer constituting the reaction product of 40–80 parts by weight of a mixture of an epoxy resin and an aldehyde resin with 20–60 parts by weight of an organic polyisocyanate in the presence of a plasticizing solvent, said resinous polymer containing unreacted isocyanate groups available for foaming, said aldehyde and epoxy resins being present in a weight ratio of about 1 to about 4 parts epoxy resin to each part aldehyde resin, said aldehyde resin being selected from the group consisting of an amine-aldehyde resin and a phenol-aldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

8. A prepolymer according to claim 7 wherein the aldehyde resin is a urea-formaldehyde resin.

9. A prepolymer according to claim 7 wherein the aldehyde resin is a melamine-formaldehyde resin.

10. A prepolymer according to claim 8 wherein the isocyanate is tolylene diisocyanate and the plasticizing solvent is an epoxy resin ester produced by the esterification of an epoxy resin with a long-chain fatty acid having from 8 to 22 carbon atoms.

11. A prepolymer according to claim 9 wherein the isocyanate is tolylene diisocyanate and the plasticizing solvent is an epoxy resin ester produced by the esterification of an epoxy resin with a long-chain fatty acid having from 8 to 22 carbon atoms.

12. A prepolymer from which a cellular plastic foam can be produced comprising the resinous polymeric reaction product of about 20–60 parts by weight of an organic polyisocyanate with about 40–80 parts by weight of an aldehyde resin and an epoxy resin present in a weight ratio of about 1 to about 4 parts epoxy resin to each part aldehyde resin, said reaction product having unreacted isocyanate groups available for foaming, said aldehyde resin being selected from the group consisting of an amine-aldehyde resin and a phenol-aldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

13. The prepolymer of claim 12 wherein said organic polyisocyanate is an aromatic diisocyanate.

14. The prepolymer of claim 12 wherein said organic polyisocyanate is an aromatic diisocyanate and said aldehyde resin is a melamine-formaldehyde resin.

15. The prepolymer of claim 12 wherein said organic polyisocyanate is an aromatic diisocyanate and said aldehyde resin is a urea-formaldehyde resin.

16. A cellular plastic material comprising the foamed reaction product of about 20–60 parts by weight of an organic polyisocyanate and about 40–80 parts by weight of an aldehyde resin and an epoxy resin foamed in the presence of water and a tertiary amine, said aldehyde and epoxy resins being present in a weight ratio of about 1 to about 4 parts epoxy resin to each part aldehyde resin, said aldehyde resin being selected from the group consisting of an amine-aldehyde resin and a phenol-aldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

17. A cellular plastic material comprising the foamed reaction product of about 20–60 parts by weight of an aromatic diisocyanate and about 40–80 parts by weight of an aldehyde resin and an epoxy resin foamed in the presence of water and a tertiary amine, said aldehyde and epoxy resins being present in a weight ratio of about 1 to about 4 parts epoxy resin to each part aldehyde resin, said aldehyde resin being selected from the group consisting of an amine-aldehyde resin and a phenol-aldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

18. A cellular plastic material comprising the foamed reaction product of about 20–60 parts by weight of an aromatic diisocyanate and about 40–80 parts by weight of an aldehyde resin and an epoxy resin foamed in the presence of water and a tertiary amine, said aldehyde and epoxy resins being present in a weight ratio of about 1 to about 4 parts epoxy resin to each part aldehyde resin, said aldehyde resin being an amine-aldehyde resin, said epoxy resin having an epoxide equivalent in the range of about 150 to about 4,000 and comprising the reaction product of epichlorhydrin and a polyhydric organic compound selected from the group consisting of a polyhydric alcohol and a bis-phenol.

19. The product of claim 18 wherein said aromatic diisocyanate is tolylene diisocyanate and said amine-aldehyde resin is a urea-formaldehyde resin.

20. The product of claim 18 wherein said aromatic diisocyanate is tolylene diisocyanate and said amine-aldehyde resin is a melamine-formaldehyde resin.

References Cited in the file of this patent

UNITED STATES PATENTS

| | | |
|---|---|---|
| 2,577,279 | Simon et al. | Dec. 4, 1951 |
| 2,594,979 | Nelson | Apr. 29, 1952 |
| 2,608,536 | Sterling | Aug. 26, 1952 |
| 2,633,458 | Shokal | Mar. 31, 1953 |
| 2,650,212 | Windemuth | Aug. 25, 1953 |